Figure 1:
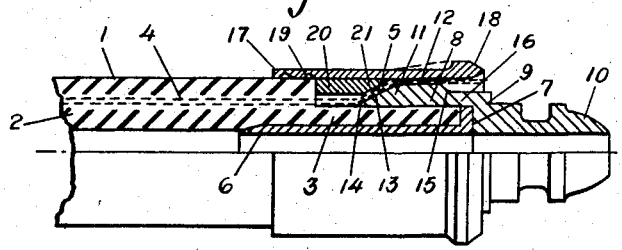

May 26, 1959 W. A. MELSOM 2,888,277
PLURAL LAYER TYPE FLEXIBLE HOSE COUPLING
Filed June 22, 1954 2 Sheets-Sheet 1

Inventor:-
Walter Arthur Melsom
By Cushman, Darby & Cushman
Attorneys

May 26, 1959 W. A. MELSOM 2,888,277
PLURAL LAYER TYPE FLEXIBLE HOSE COUPLING
Filed June 22, 1954 2 Sheets-Sheet 2

Inventor:
Walter Arthur Melsom
By Cushman, Darby & Cushman
Attorneys

United States Patent Office 2,888,277
Patented May 26, 1959

2,888,277

PLURAL LAYER TYPE FLEXIBLE HOSE COUPLING

Walter Arthur Melsom, Wembley, England, assignor to Bowden (Engineers) Limited, London, England Application June 22, 1954, Serial No. 438,583

Claims priority, application Great Britain March 15, 1954

5 Claims. (Cl. 285—149)

The present invention relates to improvements in flexible hose coupling components of the kind comprising a hose and an end fitting wherein the hose has a resilient layer which is sealed or adapted under internal fluid pressure to be sealed to the end fitting and has a reinforcing layer an end portion of which is gripped between an underlying ring and a surrounding sleeve of the fitting, the end fitting comprising an insert which is inserted into the hose and co-operates with the ring. The reinforcing material is metal, although it may have fabric covering and it may consist of ribbon-like groups of fine high tensile steel wires braided to tubular form and with or without fabric covering. Coupling components having the above features are "components of the kind specified."

An object of the present invention is to secure the reinforcing material more firmly to the end fitting and the invention is characterised in that the said ring has a circumferential external crest and an end portion of the reinforcing material extends outside the ring without passing therethrough and outwards over the said crest and by contraction of the sleeve is gripped between the crest of the ring and the sleeve and is also forced inwards and held inwards behind the crest, and preferably, as a result of contracting the sleeve, the ring is also contracted and caused to grip an end portion (forming a sealing member) of the inner resilient layer of the hose between it and the insert in order to seal the hose to the end fitting.

When the end portion of the reinforcing material is bared of resilient material of the hose it usually naturally tends to flare outwards and for the purpose of assembling the ring is deliberately or further outwardly flared and after the ring has been introduced between the flared material and the underlying resilient layer of the hose and the sleeve positioned around the bare material, that portion of the latter which surrounds the crest of the ring, conveniently a cylindrical crest, becomes opened out relatively to the normal lie of the reinforcing material. By contraction the sleeve closely approaches the ring in producing a maximum radial grip and interlock of the opened out material between the crest and the sleeve and forces the reinforcing material inwards and holds it inwards behind the crest so that relatively to the material gripped between the sleeve and the crest the reinforcing material behind the crest has a more bunched up form, with the result that any forces tending to blow the hose off the end fitting or vice versa are strongly resisted in that before separation can take place not only must the grip and interlock of the bare material between the sleeve and the crest of the ring be broken down but the reinforcing material behind the crest must be expanded and squeezed to enable it to pass between the crest of the ring and the sleeve.

The sleeve is advantageously first assembled over the body of the hose and after the ring has been introduced between the bare reinforcing material and the underlying resilient material, the sleeve is moved back thereby to force the flared reinforcing material inwards over the crest of the ring with its end portion projecting rearward of the crest.

Forwardly of the forward end of the ring, the reinforcing material starts to extend outwards from its normal lie to surround the ring and there is a tendency for the underlying resilient material to be insufficiently supported. Under high internal pressures it may be extruded outwards and become weakened or even ruptured under working conditions and especially under vibratory or pressure pulsating conditions. A further advantageous feature of the present invention consists in that the forward end of the ring externally tapers to a thin leading end, forming an annular wedge which not only promotes entry of the ring under the reinforcing material, but promotes a gradual outward change in direction of the bare material from its normal lie to the region where it surrounds the crest of the ring, and in that an internal ring portion of the sleeve itself, or a separate ring within the sleeve round the reinforcing material, just forward of the forward end of the ring and if desired with a rear extension round the wedge end of the ring is so contracted that there shall be a continuous support for the resilient material by the surrounding reinforcing material on the one hand and the crested ring on the other. The said ring portion or separate ring is hereinafter called the "outer ring" and the ring with the crest is hereinafter called the "inner ring."

Where the hose also has an outer resilient layer and the reinforcing layer at its end portion is bare of both outer and inner resilient layers and the inner layer has a portion projecting axially beyond the outer layer under the reinforcing material to form the sealing member, it is difficult to insert the inner ring (even with a wedge end) under the reinforcing material to such an extent that its forward end reaches the plane through the end of the outer layer and the need again arises to support the inner resilient layer just forward of the forward end of the inner ring, i.e., in the region between the said end of the inner ring and the end of the outer layer. In such a case in order to allow for the sleeve being moved back axially from over the body of the hose a separate outer ring is employed and this is located in the said region and as a result of contraction of the sleeve this outer ring is contracted around the portion of the inner resilient layer and the surrounding reinforcing material in this region. Alternatively the sleeve may have an external enlarged band in the aforesaid region so that when the sleeve is contracted the metal of the sleeve is forced inwards to give the desired support.

Where the hose has no outer resilient layer, said outer ring may be formed as an integral internal ring portion of the sleeve at the end of the sleeve which trails when the sleeve is being displaced axially to force the flared reinforcing material inwards, although even in this case a separate outer ring could be provided. Alternatively if the trailing end of the sleeve or the sleeve as a whole is sufficiently thin-walled, the trailing end may be contracted sufficiently to give the support to the hose forwardly of the forward end of the inner ring. By "outwards" we mean away from and by "inwards" we mean towards the axis of the hose. By "forward" we mean in the direction axially towards the body of the hose, and by "rearward" we mean in the opposite direction. By "inner ring" we mean the ring with the crest that is within the reinforcing material and by "outer ring" (when this is employed) we mean a ring that is around the reinforcing material.

Before contraction of the sleeve the external surface of the inner ring may form a ridge the crest of which is cylindrical and the sides of which may slope gradually towards the axis of the coupling, so that the forwardly sloping side forms one face of the aforesaid annular wedge and the rearwardly sloping side meets a cylindrical neck.

The outer ring may be formed with a rearward extension which overlies the forwardly sloping side of the ridge and may be made internally in the form of a cone complementary to that of the said forwardly sloping side, the inner face of the outer ring extending forwardly from the forward end of the inner ring.

The outer ring is of any suitable material suited to contraction, preferably soft metal, e.g., aluminium.

When it is stated that the insert co-operates with the inner ring, it is meant that the parts are so constructed that they will not separate axially under working conditions. For example the inner ring may have an end wall abutted by the insert or an end flange thereon, or the inner ring and insert may be brazed or otherwise secured together or may be in one piece. The said end wall may be extended and suitably shaped to form a sealing nipple, or the insert may project through the end wall and form a sealing nipple. The ring or the insert may however be formed with a screw or other suitably shaped end for co-operating with other apparatus.

When it is stated that the sleeve and inner ring are contracted it is meant that they are of such metal and are subjected to such pressure that a permanent deformation is produced.

The sleeve before contraction may be generally cylindrical both internally and externally and provided with an external annular enlargement or swaging band at or near one end behind the crest of the ridge, preferably surrounding the rearwardly sloping side of the ridge and/or the said neck and preferably extending axially over the insert collar and/or the end wall of the ring. This enlargement may have a forwardly tapering external surface to the plane of the forward edge of the cylindrical crest of the inner ring or thereabouts.

The method of assembly consists in arranging the sleeve along the body of the hose preferably so that it closely surrounds it, separating the reinforcing material from the projecting portion of the inner layer, and inserting the insert into the hose and the inner ring under the separated portion of the reinforcing material, moving back the sleeve so that it forces the reinforcing material inwards around the inner ring and then contracting the sleeve, so that as a result of the contraction, the bare reinforcing material is gripped between the crest of the inner ring and the sleeve and is forced inwards and held inwards behind the crest, and preferably so that the inner ring is contracted to seal the portion of the inner resilient layer under the inner ring and so as to provide support for the said inner layer by the surrounding reinforcing material just forwardly of the forward end of the inner ring.

Figure 2:
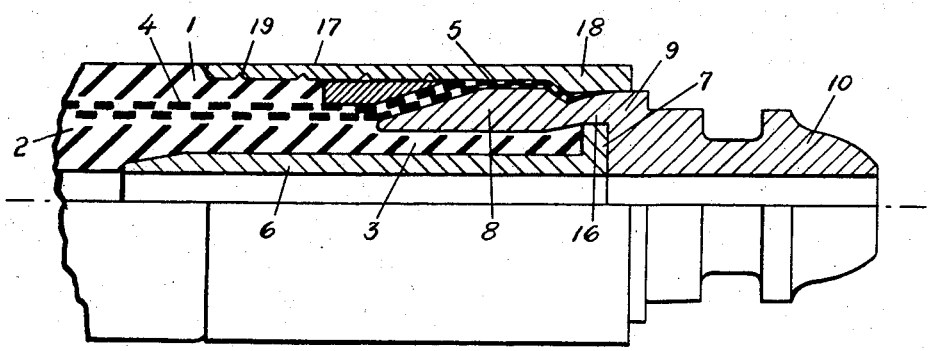
Figure 3:
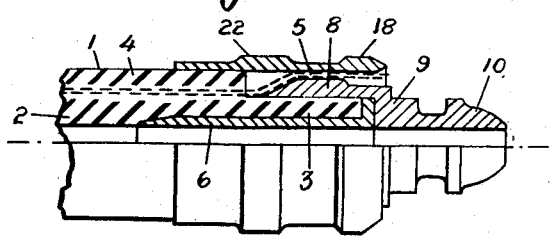
Figure 4:
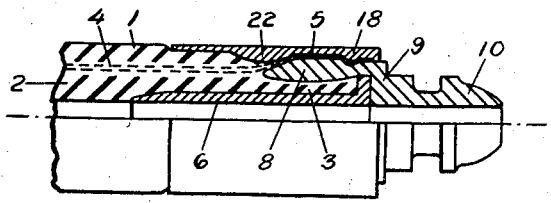
Figure 5:
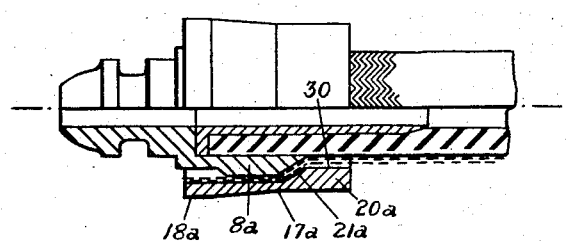
Figure 7:
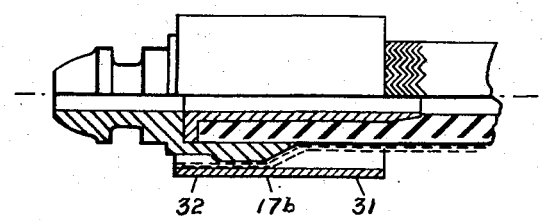
Figure 8:
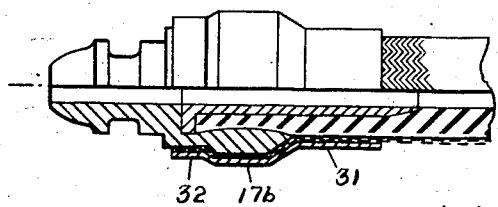

In order that the invention may be the more clearly understood reference is hereinafter made to the accompanying drawings in which Fig. 1 shows in half section the components before contraction of the sleeve and in a position ready for contraction of the sleeve and Fig. 2 is a half sectional view showing the coupling after contraction of the sleeve. Fig. 3 shows in half section a similar construction with a modified form of the sleeve when ready for contraction round the other components of the coupling and Fig. 4 shows the coupling with the sleeve contracted. Fig. 5 is a view before contraction of the sleeve and Fig. 6 a view after contraction of another form. Figs. 7 and 8 are similar views of yet another form.

Referring to Fig. 1, the hose has inner and outer resilient layers with its outer layer 1 cut away so that the inner layer 2 projects beyond the end of the outer layer, the projecting portion 3 forming a sealing member and the braided wire reinforcing layer 4 also projects beyond the outer layer, see the projecting portion 5. The metal insert 6 has an end collar or flange 7 and the inner ring 8 is a metal component separate from the insert (although it may be brazed or otherwise secured thereto) and it has an end wall 9 from which projects a sealing nipple 10. The inner ring is formed with an annular ridge 11 with a cylindrical crest 12 and sides sloping towards the axis, the forwardly sloping side 13 forming a wedge-like forward end of the ring which may terminate in a rounded end 14 and the rear sloping side 15 joining with a cylindrical neck portion 16 between the ridge and the insert collar.

The metal sleeve 17 is generally cylindrical save that at or near its rear end it has an external annular enlargement or swaging band 18 which may be shaped as shown or with a tapered exterior surface as indicated by the dotted lines. The sleeve may project over the body of the hose and its inner surface may be provided with one or more annular or helical grooves 19.

If the tapered exterior is employed the collar 7 may be made of less diameter and the inner ring contracted to an internal taper towards the collar to give a corresponding taper to the sealing member.

Between the forward end of the inner ring and the end of the outer layer of the hose and around the portion of the reinforcing material in this region is located a soft metal, e.g., aluminium, ring 20 which has a rearward extension 21 which is internally conical to lie around the conical forward side 13 of the ridge and complementary thereto.

To assemble the parts shown in Fig. 1, the sleeve 17 will have first been arranged around the body of the hose and the outer ring 20 located around the projecting portion of the inner layer and the reinforcing material adjacent the end of the outer layer. The exposed reinforcing layer is separated from the inner layer and outwardly flared. The insert 6 and the inner ring 8 are assembled to the hose. The sleeve is now slidden back towards the end of the hose and forces the bare reinforcing material 5 inwards as shown in Fig. 1, the sleeve being positioned with the swaging band 18 round or close behind the rearwardly sloping side 15 of the ridge and around the neck portion 16, the bare material being opened out on the crest of the inner ring and its end portion extending rearwardly of the crest.

The sleeve is now contracted. The swaging band 18 is thereby closed round the rear portion of the reinforcing material, forcing this inwards and bunching it behind the rear sloping side 15 of the ridge, the reinforcing material is gripped against the crest 12 of the ridge and interlocked with the sleeve and ring and the inner ring 8 contracted so as to seal the sealing member 3, and the outer ring 20 is contracted so that it presses the reinforcing material against the forwardly sloping side 13 of the ridge and closes around the projecting portion of the inner layer and the reinforcing material in the aforesaid region. The sealing member is therefore adequately supported by the two rings and the bare reinforcing material passes from under the outer ring over the external surface of the inner ring without an abrupt change of direction. The forward portion of the sleeve is contracted round the body of the hose and resilient material of the outer layer is forced into the grooves 19. The contraction may be carried out to such an extent that the external diameter of the sleeve finally substantially corresponds to that of the body of the hose.

Should the fluid under pressure have access under the sealing member it will press this more firmly against the inside of the inner ring 8 and so long as the inner layer remains sealed to the said ring there is no escape path to the exterior.

Where the reinforcing material is secured between the crest of the ridge and the sleeve the distance between the crest and the internal wall of the sleeve is small, i.e., a constriction is set up which tends to lock up the reinforcing material on either side of it and particularly the bunched up material behind the crest.

In the alternative form shown in Figs. 3 and 4 the outer ring 20 is dispensed with and the sleeve is provided with a further external annular enlargement or swaging band 22 disposed around the aforesaid region between the forward end of the inner ring and the end of the outer layer and this band is contracted into the cavity at this region so as to support the inner layer and the surrounding reinforcing material against outward displacement in this region as shown in Fig. 4.

Figs. 5 to 8 show convenient applications of the invention to hoses without an outer resilient layer, e.g., where the inner resilient layer is of a thermoplastic material such as polytetrafluoroethylene.

Figure 6:
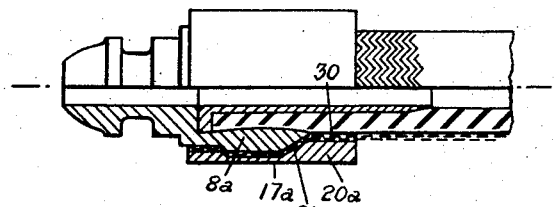

In the form shown in Figs. 5 and 6 the sleeve 17a has an integral internal ring 20a, the inner face 30 of which extends forward from substantially the forward end of the inner ring 8a, and like the ring 20 in Fig. 1 it may have an extension 21a with a female conical surface complementary to the taper of the external surface of the inner ring. The sleeve is provided with an externally enlarged rear end 18a tapering forwardly to approximately the plane of the forward end of the cylindrical crest of the inner ring.

In the form shown in Figs. 7 and 8 a sleeve 17b of uniform wall thickness is employed of a sufficiently thin-walled character to enable its forward end portion 31 to be contracted inwards as is shown in Fig. 8 to a cylindrical portion of reduced diameter extending forwardly from substantially the forward end of the inner ring, the rear end 32 of the sleeve being contracted to force the reinforcing material inwards behind the crest of the inner ring.

If desired there may be a supplementary ring under the sleeve to grip the bare reinforcing material on the crest of the inner ring, the supplementary ring being contracted by the contraction of the sleeve.

Where the hose has a contiguous layer or layers of braided or other fabric reinforcing material, this is removed where the wire braiding is to be directly gripped between the sleeve and the ring or, if a supplementary ring is provided between the sleeve and the reinforcement, between the rings.

If the hose has two or more layers of wire braiding separated by resilient material one or more of the layers of braiding may be gripped.

It is to be understood that in carrying out the method herein claimed the reinforcing material may be bared before or after the sleeve has been placed over the body of the hose and the insert may be inserted into the hose before or after the reinforcing material is bared of the inner layer.

What I claim is:

1. A flexible hose coupling component comprising a hose and an end fitting, said hose comprising at least one resilient layer and a surrounding reinforcing layer, said fitting comprising a ring, a surrounding sleeve and an insert, said insert being inserted into the hose, an end portion of said resilient layer forming an annular sealing member which lies between the insert and said ring, said ring having a circumferential external crest and an end portion of the material of the reinforcing layer extending outside said ring without passing therethrough and outwards from the normal lie of the said layer over the said crest and upon contraction of the sleeve being gripped in this condition between the sleeve and the crest and also being forced inwards and held inwards behind the crest so that before separation can take place under working conditions not only must the grip of the opened-out bare material on the crest be broken down but the reinforcing material behind the crest must be expanded and squeezed to enable it to pass between the sleeve and the crest of said ring; the forward end of said ring constituting an inner ring externally tapering into a thin leading end and forming an annular wedge to facilitate insertion under and to allow gradual change of direction outward of the bare reinforcing material from its normal lie to the region where it surrounds the crest of the ring, an outer ring within said sleeve and having its inner face extending forwardly from substantially the forward end of said inner ring, and having been so contracted round the reinforcing material, as a result of contracting said sleeve, that there is a substantially continuous support for the resilient material by the reinforcing material under the outer ring on the one hand and directly by the inner ring on the other, and the inner ring, as a result of the contraction of the sleeve, being also contracted so that the outwardly lying reinforcing material is gripped between the deformed sleeve and the inner ring and the said sealing member is gripped between the deformed inner ring and the insert in order to seal the hose to the end fitting.

2. A flexible hose coupling component comprising a hose and an end fitting, said hose comprising at least one resilient layer and a surrounding reinforcing layer, said fitting comprising an inner ring, a surrounding sleeve and an insert, said insert being inserted into the hose, an end portion of said resilient layer forming an annular sealing member which lies between the insert and said ring, said ring having a circumferential external crest and an end portion of the material of the reinforcing layer extending outside said ring without passing therethrough and outwards from the normal lie of the said layer over the said crest and upon contraction of the sleeve being gripped in this condition between the sleeve and the crest and also being forced inwards and held inwards behind the crest so that before separation can take place under working conditions not only must the grip of the opened-out bare material on the crest be broken down but the reinforcing material behind the crest must be expanded and squeezed to enable it to pass between the sleeve and the crest of said ring; an outer ring within said sleeve, said outer ring having an extension which overlies and has a female taper substantially complementary to that of the tapering surface of the inner ring, said outer ring as a result of the contraction of the sleeve, being also contracted so that the outwardly lying reinforcing material is gripped between the deformed sleeve and the inner ring and the said sealing member is gripped between the deformed inner ring and the insert in order to seal the hose to the end fitting.

3. A flexible hose coupling component comprising a hose and an end fitting, said hose comprising at least one resilient layer and a surrounding reinforcing layer, said fitting comprising an inner ring, a surrounding sleeve and an insert, said insert being inserted into the hose, an end portion of said resilient layer forming an annular sealing member which lies between the insert and said ring, said ring having a circumferential external crest and an end portion of the material of the reinforcing layer extending outside said ring without passing therethrough and outwards from the normal lie of the said layer over the said crest and upon contraction of the sleeve being gripped in this condition between the sleeve and the crest and also being forced inwards and held inwards behind the crest so that before separation can take place under working conditions not only must the grip of the opened-out bare material on the crest be broken down but the reinforcing material behind the crest must be expanded and squeezed to enable it to pass between the sleeve and the crest of said ring; an outer ring within said sleeve, said hose comprising inner and outer layers of resilient material and an intermediate tubular layer of reinforcing material and said reinforcing layer and the inner resilient layer projecting axially beyond the outer layer, in which said inner ring has been inserted under the bare reinforcing material so that the forward end of the inner ring terminates at a distance rearwardly from the end of the outer layer, the bare reinforcing material extending gradually outwards from the normal lie of the reinforcing layer from the forward end of the inner ring over the external surface of the said inner ring, and the outer ring being separate from the sleeve and located in the region between the forward end of the inner ring and the end of the outer layer so that upon contraction of the sleeve the outer ring will be contracted round the portion of the inner layer and the surrounding reinforcing layer in this region so as to support the said portion against outward displacement; and the inner ring, as a result of the contraction of the sleeve, being also contracted so that the outwardly lying reinforcing material is gripped between the deformed sleeve and inner ring and the said sealing member is gripped between the deformed inner ring and the insert in order to seal the hose to the end fitting.

4. A flexible hose coupling component comprising a hose and an end fitting, said hose comprising at least one resilient layer and a surrounding braided metal reinforcing layer, said fitting comprising an inner ring, surrounding sleeve means and an insert, said insert being inserted into the end of said resilient layer, an end portion of said resilient layer forming an annular sealing member which lies between the insert and said inner ring, said inner ring having a circumferential external crest and an end portion of the material of the braided metal reinforcing layer extending outside said inner ring without passing therethrough, and outwards from the normal lie of the said braided metal reinforcing layer over the said crest on the inner ring, and upon contraction of the sleeve means being gripped in this condition between the sleeve means and the crest and also being forced inwards and held inwards behind the crest so that before separation can take place under working conditions not only must the grip of the opened-out reinforcing material on the crest be broken down, but the reinforcing material behind the crest must be expanded and squeezed to enable it to pass between the sleeve means and the crest of said inner ring, said insert having an axial extent within the hose greater than the axial extent of the inner ring, the forward end of said inner ring externally tapering into a thin leading end and forming an annular wedge to facilitate insertion and allow gradual change of direction outward of the bare reinforcing material from its normal lie to the region where it surrounds the crest of the inner ring, said sleeve means having an axial extent greater than the axial extent of said inner ring and providing an outer ring having its inner face extending forwardly from substantially the thin leading end of said inner ring, and having been so contracted around the reinforcing material as a result of contracting said sleeve means that there is a substantially continuous support for the resilient material between the insert and the metal reinforcing material under said outer ring of the sleeve means, on the one hand, and between the insert and the inner ring on the other, and said inner ring as a result of the contraction of the sleeve means being also contracted so that the outwardly lying reinforcing material is gripped between the deformed sleeve means and the inner ring and the said sealing member is gripped between the deformed inner ring and the insert in order to seal the hose end to the fitting.

5. A flexible hose coupling component comprising a hose and an end fitting, said hose comprising at least one resilient layer and a surrounding braided metal reinforcing layer, said fitting comprising an inner ring, a surrounding sleeve means and an insert, said insert being inserted into the end of said resilient layer, an end portion of said resilient layer forming an annular sealing member which lies between the insert and said inner ring, said inner ring having a circumferential external crest, said inner ring having an annular recess adjacent the crest, an end portion of the material of the braided metal reinforcing layer extending outside said inner ring without passing therethrough, and outwards from the normal lie of the said braided metal reinforcing layer over the said crest on the inner ring, and upon contraction of the sleeve means being gripped in this condition between the sleeve means and the crest and also being forced inwards and held inwards behind the crest in said recess so that before separation can take place under working conditions not only must the grip of the opened-out reinforcing material on the crest be broken down, but the reinforcing material behind the crest must be expanded and squeezed to enable it to pass between the sleeve means and the crest of said inner ring, said sleeve means including a thickened exterior shoulder adapted to be contracted into said annular recess, said insert having an axial extent within the hose greater than the axial extent of the inner ring, the forward end of said inner ring externally tapering into a thin leading end and forming an annular wedge to facilitate insertion and allow gradual change of direction outward of the bare reinforcing material from its normal lie to the region where it surrounds the crest of the inner ring, said sleeve means having an axial extent greater than the axial extent of said inner ring and providing an outer ring having its inner face extending forwardly from substantially the thin leading end of said inner ring, and having been so contracted around the reinforcing material as a result of contracting said sleeve means that there is a substantially continuous support for the resilient material between the insert and the metal reinforcing material under said outer ring of the sleeve means, on the one hand, and between the insert and the inner ring on the other, and said inner ring as a result of the contraction of the sleeve means being also contracted so that the outwardly lying reinforcing material is gripped between the deformed sleeve means and the inner ring and the said sealing member is gripped between the deformed inner ring and the insert in order to seal the hose end to the fitting.

References Cited in the file of this patent

UNITED STATES PATENTS

| | | |
|---|---|---|
| 2,216,468 | Farrar | Oct. 1, 1940 |
| 2,384,635 | Melsom | Sept. 11, 1945 |
| 2,430,921 | Edelmann | Nov. 18, 1947 |
| 2,463,293 | Mentel | Mar. 1, 1949 |
| 2,722,437 | Phillips | Nov. 1, 1935 |

FOREIGN PATENTS

| | | |
|---|---|---|
| 1,011,576 | France | Apr. 2, 1952 |
| 520,020 | Belgium | Nov. 16, 1953 |